United States Patent
Streuer et al.

(10) Patent No.: US 7,144,657 B2
(45) Date of Patent: Dec. 5, 2006

(54) ELECTRICAL RECHARGEABLE BATTERY

(75) Inventors: Peter Streuer, Hannover (DE); Christian Rosenkranz, Wunstorf (DE); Gerolf Richter, Hildesheim (DE)

(73) Assignee: VB Autobatterie GmbH, Hannover (DE)

( * ) Notice: Subject to any disclaimer, the term of this patent is extended or adjusted under 35 U.S.C. 154(b) by 406 days.

(21) Appl. No.: 10/273,113

(22) Filed: Oct. 17, 2002

(65) Prior Publication Data

US 2003/0077485 A1   Apr. 24, 2003

(30) Foreign Application Priority Data

Oct. 19, 2001   (DE) ................ 107 52 701

(51) Int. Cl.
  *H01M 2/02*  (2006.01)
  *H01M 2/08*  (2006.01)
(52) U.S. Cl. ..................... 429/178; 429/182
(58) Field of Classification Search ............. 429/178, 429/180, 182

See application file for complete search history.

(56) References Cited

U.S. PATENT DOCUMENTS

| 4,160,857 A | * | 7/1979 | Nardella et al. | 429/97 |
| 5,389,462 A | * | 2/1995 | Lin | 429/121 |
| 6,001,506 A | * | 12/1999 | Timmons et al. | 429/178 |

FOREIGN PATENT DOCUMENTS

| DE | 2 319 412 | 11/1973 |
| DE | 198 25 245 C1 | 3/2000 |
| DE | 198 25 246 C1 | 3/2000 |

* cited by examiner

*Primary Examiner*—Joseph Patrick Ryan
*Assistant Examiner*—Julian Mercado
(74) *Attorney, Agent, or Firm*—Foley & Lardner LLP

(57) ABSTRACT

An electrical rechargeable battery including a housing, positive and negative electrodes arranged in the housing, separators positioned between the electrodes, electrolyte in the housing, at least one end pole connected to at least one of the electrodes and adapted to connect to a cable, and a cover connected to the housing and adapted to receive a battery isolating switch connected to the cable such that the switch is integrated with the cover when the cable is connected to the end pole.

12 Claims, 1 Drawing Sheet

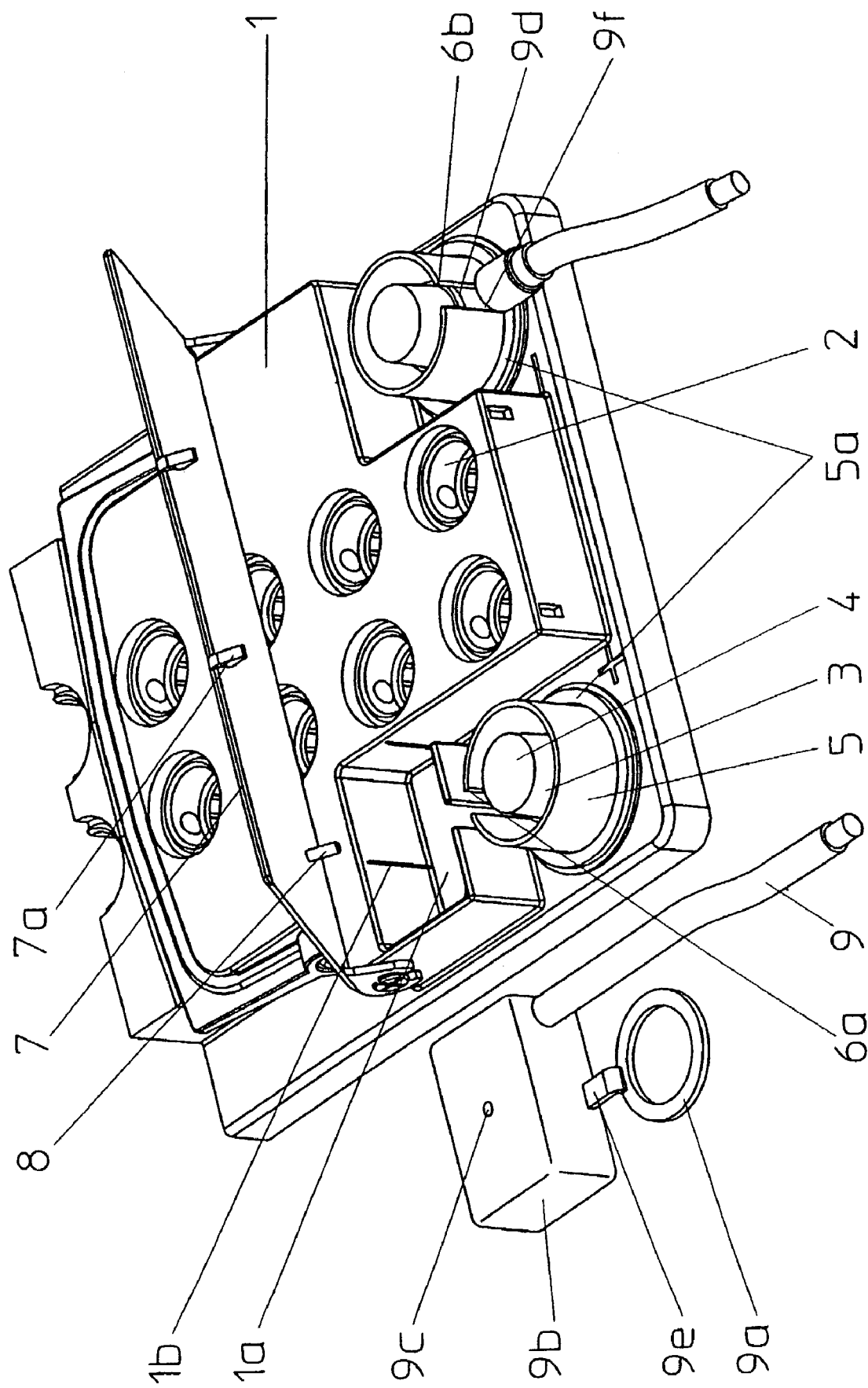

ELECTRICAL RECHARGEABLE BATTERY

RELATED APPLICATION

This patent application claims the benefit of German Patent Application No. DE 101 52 701.2, filed Oct. 19, 2001.

FIELD OF THE INVENTION

This invention relates to an electrical rechargeable battery having positive and negative electrodes which are arranged in a housing, having separators between them, having an electrolyte and having at least one end pole and a cable connected to it. The invention is preferably applicable to starter batteries for motor vehicles.

BACKGROUND

Cable connections with battery isolating switches for electrical rechargeable batteries, in particular for starter batteries, are known in various embodiments such as circuit breakers. When disturbance states occur, for example, in the event of an accident or a short circuit, the battery is disconnected.

DE 23 19 412 discloses a rechargeable battery provided with a switching apparatus permanently installed in the battery, interrupts a cable connected to the battery, when a sudden change occurs in the speed of travel, and keeps it interrupted until it is moved to the closed position once again, by external action.

DE 198 25 245 C1 and DE 198 25 246 C1 describe a main battery switch, in particular for motor vehicles, which has a switch housing, which can be fitted to the positive pole of the battery, and a pole terminal firmly clamped to the positive pole within the housing. The main switch is used as a transit or deactivation switch to disconnect the battery from the vehicle power supply system when the vehicle is out of use for a lengthy period, or as a disturbance switch which, for example by means of a short-circuit sensor or a crash sensor, disconnects the generator/starter cable from the battery while the vehicle power supply system remains in operation.

These known battery isolating switches do not ensure that the current is interrupted before disconnection of the rechargeable battery cable connections. Hence, there is no adequate protection against direct contact, as is important for relatively high operating voltages, in particular, before or during the assembly or installation of such electrical rechargeable batteries.

It would therefore be advantageous to provide a rechargeable battery in which disconnection of a connection that carries current between the rechargeable battery and an electrical supply network is prevented for as long as a load is applied.

SUMMARY OF THE INVENTION

This invention relates to an electrical rechargeable battery including a housing, positive and negative electrodes arranged in the housing, separators positioned between the electrodes, electrolyte in the housing, at least one end pole connected to at least one of the electrodes and adapted to connect to a cable, and a cover connected to the housing and adapted to receive a battery isolating switch connected to the cable such that the switch is integrated with the cover when the cable is connected to the end pole.

BRIEF DESCRIPTION OF THE DRAWINGS

The construction and method of operation will be explained in the following text with reference to the FIGURE, which is a schematic perspective view of a battery cover with a battery isolating switch according to the invention.

DETAILED DESCRIPTION

It will be appreciated that the following description is intended to refer to specific embodiments of the invention selected for illustration in the drawing and is not intended to define or limit the invention, other than in the appended claims.

According to the drawing, an end pole 3 is connected by means of a cable 9 to a battery isolating switch 9b, which prevents connection of the end pole 3 of the rechargeable battery to an electrical network from being disconnected while on load. An installation area is preferably provided in the structure of the cover 1 for the battery isolating switch 9b. In particular, a battery isolating switch 9b is provided which, for example, is positioned in a cutout 1a in the cover 1 by means of guide ribs 1b. The battery isolating switch 9b is preferably switched by operation of a pole cover 7, which can be attached to the cover 1 in a hinged manner, for example. The pole cover 7 has, in particular, on the lower face an integrally formed pin 8 for switch operation, which can engage in a switching opening 9c in the battery isolating switch 9b.

However, a non-contacting mechanism is also feasible, for example, with a magnet attached to the cover and a reed relay in the battery isolating switch 9b. The pole cover 7 can be locked in the closed state via snap-action hooks 7a on the cover 1 and/or on the pole cover 7. However, the rechargeable battery can also be disconnected by operating the battery isolating switch 9b via external sensors from a vehicle power supply system controller, or by some other remotely arranged controller. The sensors may, for example, be temperature sensors, overcurrent sensors or accident sensors. A vehicle power supply system controller evaluates measured physical variables. The rechargeable battery is disconnected, for example, as a function of the value of the state of charge (SOC), of the value of the state of health (SOH), or of other derived/calculated/measured variables.

The end poles 3, to which the cables 9 are connected, are arranged in the cover 1, which also contains normal filling openings 2. A cylindrical contact protection device 5, which can rotate freely and is in the form of a wall surrounding the end pole 3, shields the end pole 3 on its sides such that the end pole 3 is accessible only from above and via narrow vertical slots 6a and 6b in the surrounding contact protection device 5, which is composed of plastic. An annular cable lug 9a or 9d is placed over the end pole 3 for cable connection, ensuring that contact is made with the end pole 3 during the contact-making process only after passing the electrically isolating pole cap 4. The annular cable lug may be attached by means of a screw cap (not shown).

The screw cap has an internal thread, in particular, composed of metal and is screwed to the end pole, which is provided on the outside with a corresponding threaded sleeve.

The cable lugs 9a and 9d are provided with connections 9e and 9f whose widths are chosen to be different for the positive and negative cable connections to prevent the positive and negative cables 9 from being incorrectly connected to the associated end pole. These widths correspond to the likewise different widths of the slots 6a and 6b in the contact protection device 5.

The cables 9 can also be protected against being incorrectly connected by the end poles 3 having different diameters, corresponding to holes of different width in the cable lugs 9a and 9d. An increased protection level is achieved if both measures are combined and, for example, one end pole 3 with a relatively small diameter is combined with a narrow slot 6a or 6b in the contact protection device 5, and one end pole 3 with a relatively large diameter is combined with a broader slot 6a or 6b in the contact protection device 5.

The contact protection device 5 is held in a mounting ring 5a, which is provided on the cover 1, or in attachment claws which are integrally formed on the cover 1.

Apart from a cable lug 9a or 9d being clamped as described above, the electrical connection can also be provided by means of a plug connection. In this variant, there is no need for the external thread. The electrical contact surface of the end pole 3 can advantageously be provided with a structured pattern on the surface, for example, by means of circumferential grooves.

The invention claimed is:

1. An electrical rechargeable battery comprising:
   a housing;
   positive and negative electrodes arranged in the housing; separators positioned between the electrodes; electrolyte in the housing;
   at least one end pole connected to at least one of the electrodes;
   a first cover connected to the housing and including a cutout adapted to receive a battery isolating switch configured for connection to the end pole by a cable lug and to a cable such that the switch is provided in the cutout in the first cover when the cable lug is connected to the end pole; and
   a second cover coupled to the first cover, wherein the battery isolating switch is actuated by closing and opening the second cover.

2. The electrical rechargeable battery according to claim 1, wherein the second cover is a pole cover.

3. The electrical rechargeable battery according to claim 1, wherein the second cover is mounted in a hinged manner on the first cover.

4. The electrical rechargeable battery according to claim 1, wherein one of the first cover and the second cover is provided with snap-action hooks for locking the second cover in a selected position.

5. The electrical rechargeable battery according to claim 1, further comprising a projecting pin arranged on a lower face of the second cover to actuate the battery isolating switch.

6. The electrical rechargeable battery according to claim 1, wherein the battery isolating switch is actuated via at least one external sensor.

7. The electrical rechargeable battery according to claim 6, wherein the external sensor is selected from the group consisting of temperature sensors, overcurrent sensors and accident sensors.

8. The electrical rechargeable battery according to claim 1, wherein the second covet comprises a pin for actuating the switch.

9. An electrical rechargeable battery comprising:
   a housing;
   positive and negative electrodes arranged in the housing; separators positioned between the electrodes; electrolyte in the housing;
   at least one end pole connected to at least one of the electrodes and adapted to connect to a cable; and
   a cover connected to the housing and adapted to receive a battery isolating switch connected to the cable such that the switch is integrated with the cover when the cable is connected to the end pole;
   wherein the cable connects to the end pole with a cable lug and wherein the end pole is surrounded by a cylindrical contact protection device which is freely rotatable and has a slot which is accessible only from above.

10. The electrical rechargeable battery according to claim 9, wherein the contact protection device is attached by claws integrally formed on the pole cover.

11. The electrical rechargeable battery according to claim 9, further comprising an electrically insulating screw cap composed of a hard plastic material with a thread attached to the cable lug.

12. The electrical rechargeable battery according to claim 9, wherein the contact protection device has slots of different widths such that cable connections of correspondingly different widths cannot be incorrectly connected.

* * * * *

UNITED STATES PATENT AND TRADEMARK OFFICE
CERTIFICATE OF CORRECTION

| | | |
|---|---|---|
| PATENT NO. | : 7,144,657 B2 | |
| APPLICATION NO. | : 10/273113 | |
| DATED | : December 5, 2006 | |
| INVENTOR(S) | : Peter Streuer, Christian Rosenkranz and Gerolf Richter | |

It is certified that error appears in the above-identified patent and that said Letters Patent is hereby corrected as shown below:

Column 4:
line 13, replace "covet" with --cover--.

Signed and Sealed this

Eighth Day of May, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,144,657 B2 |
| APPLICATION NO. | : 10/273113 |
| DATED | : December 5, 2006 |
| INVENTOR(S) | : Peter Streuer, Christian Rosenkranz and Gerolf Richter |

It is certified that error appears in the above-identified patent and that said Letters Patent is hereby corrected as shown below:

On The Title Page: Item (30)

In the Foreign Application Priority Data (30) on the cover page, replace "107 52 701" with --101 52 701--.

Signed and Sealed this

Eighteenth Day of March, 2008

JON W. DUDAS
*Director of the United States Patent and Trademark Office*